United States Patent
Schrader

(10) Patent No.: US 8,176,733 B2
(45) Date of Patent: May 15, 2012

(54) TORQUE CONVERTER HAVING AN INTEGRATED COVER WITH BEARING SUPPORT

(75) Inventor: Scott Schrader, Canton, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 810 days.

(21) Appl. No.: 12/291,614

(22) Filed: Nov. 12, 2008

(65) Prior Publication Data

US 2009/0139817 A1    Jun. 4, 2009

Related U.S. Application Data

(60) Provisional application No. 61/003,047, filed on Nov. 14, 2007.

(51) Int. Cl.
*F16D 33/18* (2006.01)

(52) U.S. Cl. ......................................................... 60/330
(58) Field of Classification Search ..................... 60/330
See application file for complete search history.

(56) References Cited

U.S. PATENT DOCUMENTS

| | | | |
|---|---|---|---|
| 2,342,208 A * | 2/1944 | Miller | 60/353 |
| 2,697,330 A * | 12/1954 | Odman | 60/353 |
| 5,667,043 A | 9/1997 | Dehrmann et al. | |
| 6,085,879 A | 7/2000 | Ebinger et al. | |
| 2002/0038546 A1 * | 4/2002 | Yamanaka et al. | 60/330 |

* cited by examiner

*Primary Examiner* — Daniel Lopez
(74) *Attorney, Agent, or Firm* — Davidson, Davidson & Kappel, LLC

(57) ABSTRACT

A torque converter including a cover, the cover having an axis and having an axially extending flange about the axis, the flange defining an aperture, a pilot fitted within the aperture, and a turbine hub connected to the flange.

18 Claims, 4 Drawing Sheets

TORQUE CONVERTER HAVING AN INTEGRATED COVER WITH BEARING SUPPORT

Priority to U.S. Provisional Patent Application Ser. No. 61/003,047, filed Nov. 14, 2007, is claimed, the entire disclosure of which is hereby incorporated by reference herein.

The present invention relates generally to a torque converter having a cover.

BACKGROUND

U.S. Pat. Nos. 5,667,043 and 6,085,879, hereby incorporated by reference herein, disclose torque converters.

FIG. 1 is a cross sectional view of a prior art torque converter 10, for example as in U.S. Pat. No. 5,667,043. Torque converter 10 contains a cover 2, an impeller 32, a turbine 30, a stator 34 and a lock-up clutch 38. Lock-up clutch 38 includes a piston 28, a plate 40, and friction linings 24, 26. Between cover 2 and piston 28 is a chamber 20. Turbine 30 is oriented concentrically to a hub axis 4. Connected to cover 2 via a weld is a bearing neck 6 which is guided into a crankshaft of an internal combustion engine. Bearing neck 6 and a support ring 8 form one piece, referred to as a pilot 14. Pilot 14 includes a flow guide 16 which can extend into chamber 20. Piston 28 is connected via leaf springs 22 to a ring plate 18. Ring plate 18 can be pressed to support ring 8. Support ring 8 is connected to a turbine hub 12 via a bearing 42. Turbine hub 12 is mounted on a drive shaft 36.

SUMMARY OF THE INVENTION

A torque converter including a cover, the cover having an axis and having an axially extending flange about the axis, the flange defining an aperture, a pilot fitted within the aperture, and a turbine hub connected to the flange.

BRIEF DESCRIPTION OF THE INVENTION

FIG. 1 illustrates a sectional view of a prior art torque converter.

An embodiment of the present invention is described with respect to the following detailed description taken in conjunction with the accompanying drawing, in which.

DETAILED DESCRIPTION

Figure 1:
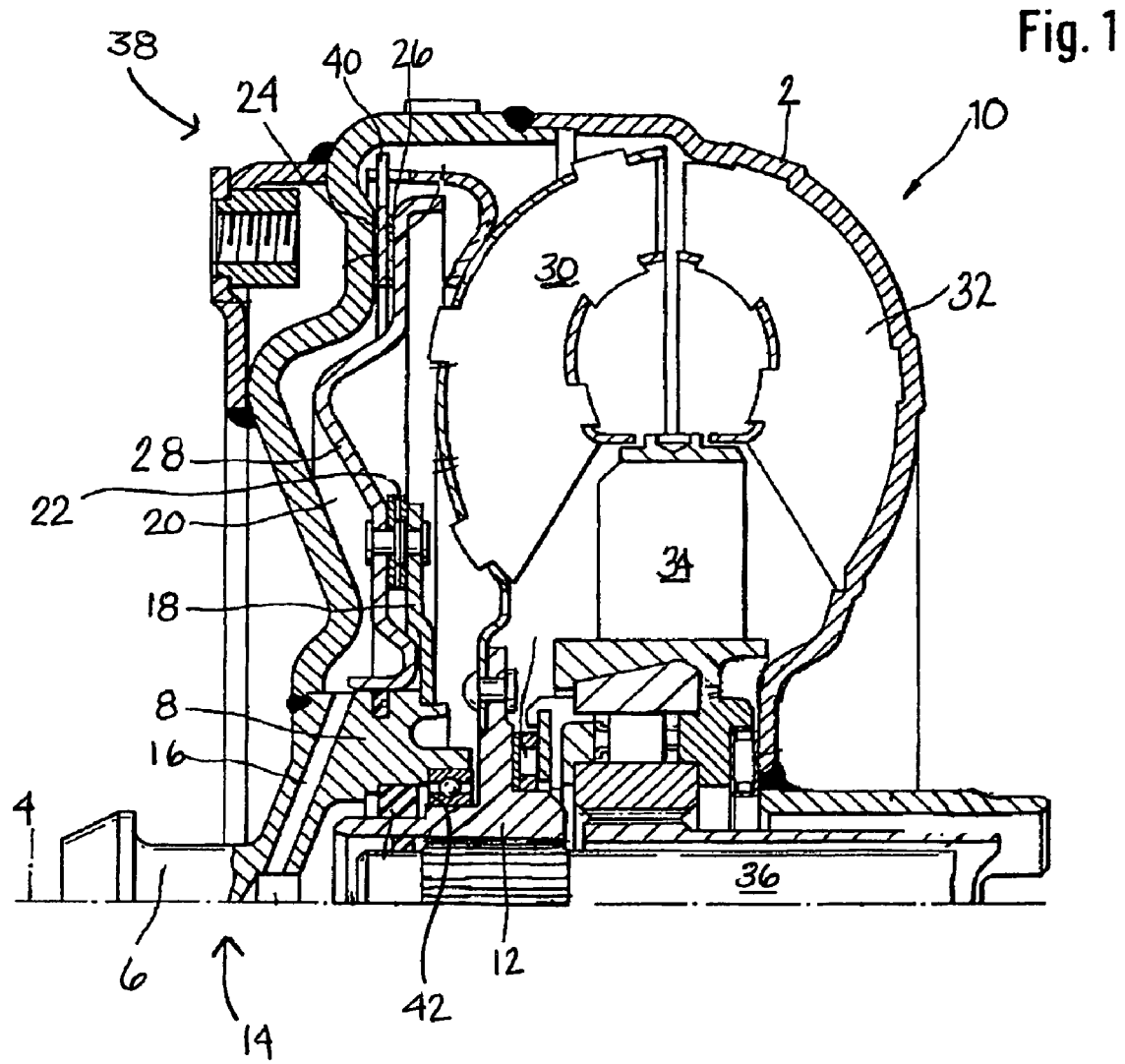
Figure 2:
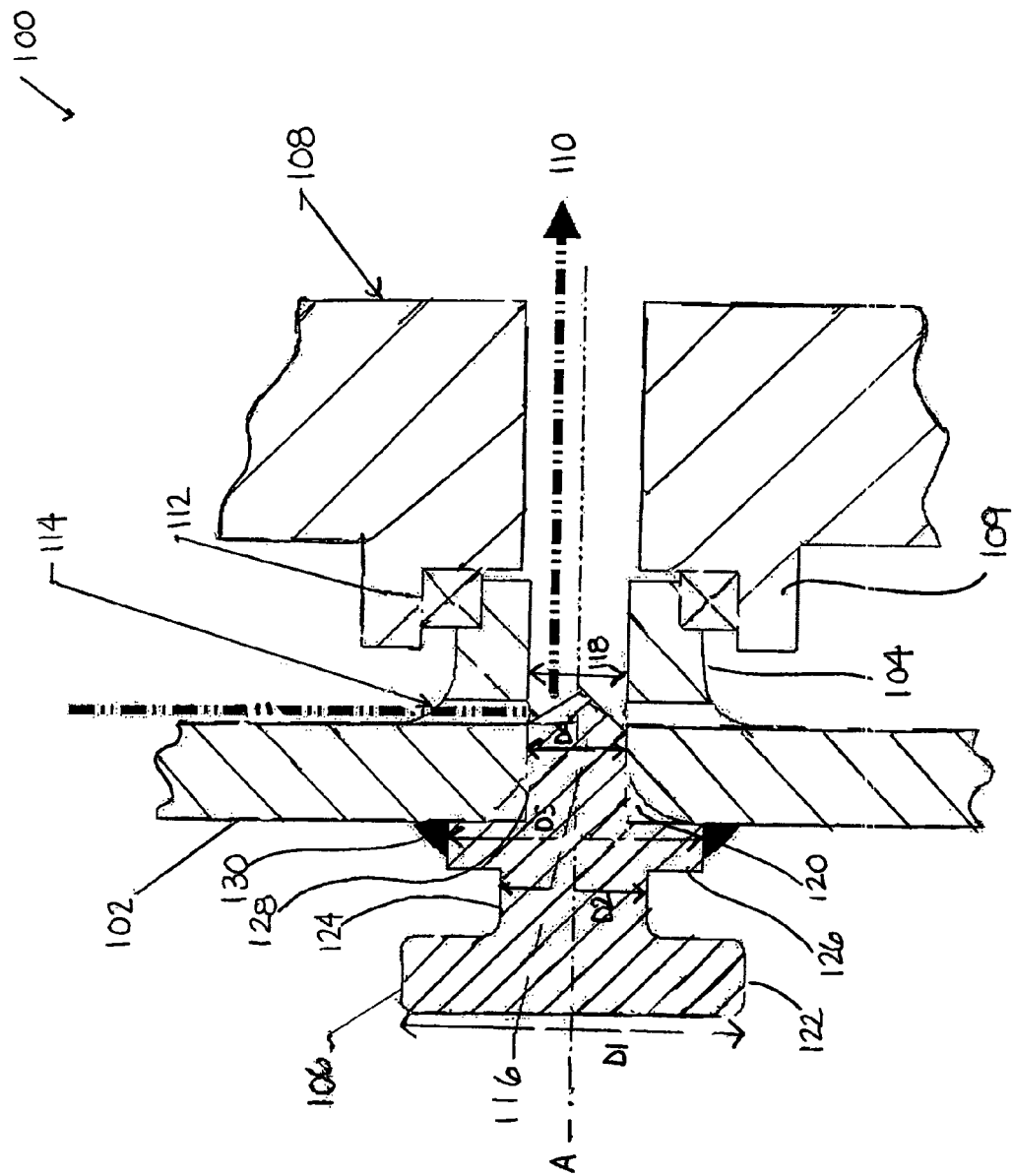
FIG. 2 illustrates a sectional view of one embodiment of a torque converter of the present invention.
Figure 4:
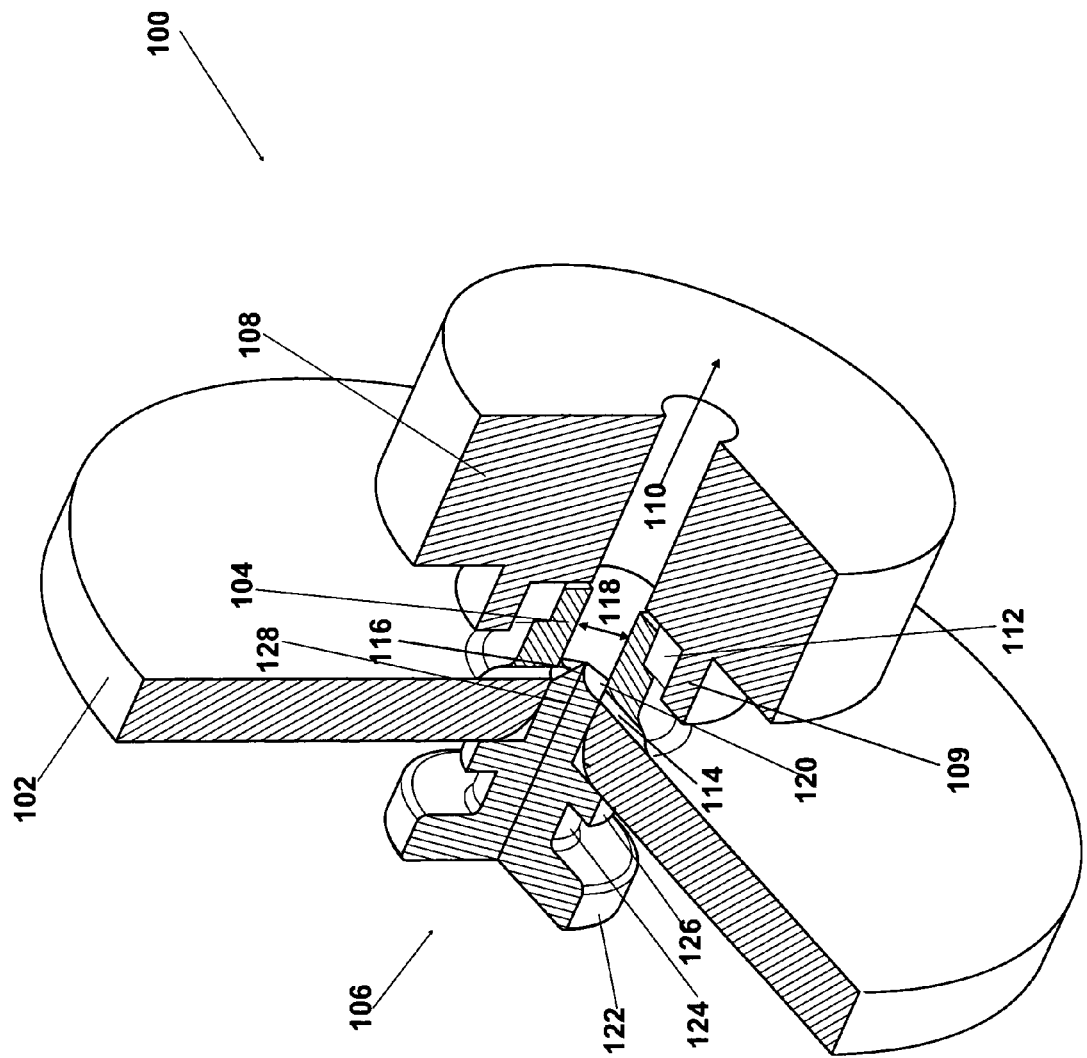
FIG. 4 is a perspective view of the embodiment of FIG. 2 of the present invention.

FIG. 2 and FIG. 4 both show a section of a torque converter 100 which can have a pump impeller, a turbine, an impeller, a stator and a lock-up clutch as described with respect to the torque converter in FIG. 1. Torque converter 100 of the present invention has an axis A and includes a cover 102 and a pilot 106. Cover 102 encloses a turbine hub 108. Cover 102 has an axially extending flange 104 bending inward toward turbine hub 108. Flanges 104 define an aperture 118. Pilot 106 is fitted in aperture 118. Pilot 106 may be welded 130 to cover 102. A space 120 is created between pilot 106 and cover 102. Flow holes 114 are stamped in flanges 104 of cover 102 allowing fluid to flow through passageway 110. Flange 104 supports a ball bearing 112 located between flange 104 of cover 102 and turbine hub 108. Turbine hub 108 thus may also have an axially extending flange 109, with bearing 112 located radially inward with respect to flange 109.

Pilot 106 may be forged. Pilot 106 may have four different radial diameters D1, D2, D3 and D4. Diameter D4 may be equivalent to a diameter of aperture 118 in cover 102. The portion of pilot 106 with diameter D4 is inserted in aperture 118 and may have a fin 116. D4 axially extends contacting the sides of aperture 118. Fin 116 drives the flow from stamped flow holes 114 through passageway 110, or vice versa. The portion of pilot 106 having diameter D3 is welded to cover 102.

Figure 3:
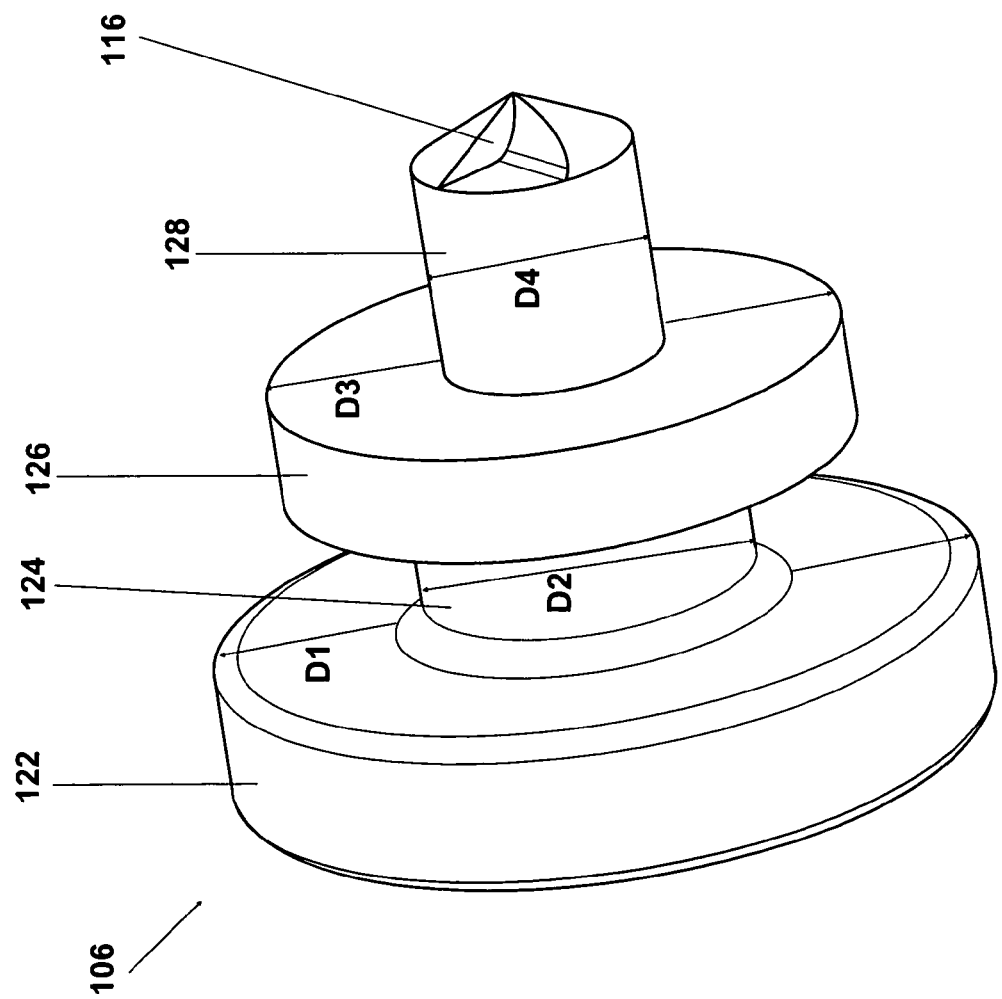
FIG. 3 illustrates the pilot in the embodiment of FIG. 2 of the present invention.

FIG. 3 shows pilot 106 in a more detailed section. Pilot 106 has 4 cylindrical portions 122, 124, 126 and 128 with varying diameters D1, D2, D3, D4. Portion 128 has a fin 116. Diameters of the cylindrical portions D1 and D3 are larger than other portions D2 and D4, D4 being the smallest.

The present invention eliminates one component from the current art which enhances performance. Furthermore, the reduction in the necessary components may improve both cost and efficiency of manufacturing. Flange 104 may for example be created integral with the cover, for example via a punching process.

What is claimed is:

1. A torque converter comprising:
   a cover, the cover having an axis and having an axially extending flange about the axis, the flange defining an aperture;
   a pilot fitted within the aperture;
   a turbine hub; and
   a bearing on a radial exterior of the flange connecting the turbine hub to the flange.

2. The torque converter as recited in claim 1 wherein the bearing is a ball bearing.

3. The torque converter as recited in claim 1 wherein the pilot has different radial diameters.

4. The torque converter as recited in claim 1 wherein the pilot has fins facing the aperture, the fins driving a fluid flow.

5. The torque converter as recited in claim 1 wherein flow holes are stamped in the flange the cover.

6. The torque converter as recited in claim 1 wherein the pilot is welded to the cover.

7. A method for manufacturing a torque converter comprising:
   forming a flange in a cover, the flange extending axially about an aperture;
   inserting the flange into a turbine hub; and
   placing a pilot within the aperture to close off the aperture.

8. The method as recited in claim 7 further comprising forming holes radially in the flange extending from an outer surface of the flange into the aperture.

9. The method as recited in claim 7 further comprising positioning a bearing on a radial exterior of the flange between the flange and the turbine hub.

10. The method as recited in claim 7 further comprising forming a flange on the turbine hub, the flange in the cover being inserted in the turbine hub inside of the flange on the turbine hub.

11. The method as recited in claim 10 further comprising positioning a bearing between the flange in the cover and the flange on the turbine hub.

12. The method as recited in claim 7 further comprising forming the pilot to include fins, the fins facing the aperture and driving a fluid flow when the pilot is placed within the aperture.

13. A torque converter comprising:
a cover, the cover having an axis and having an axially extending flange about the axis, the flange defining an aperture;
a pilot fitted within the aperture; and
a turbine hub connected to the flange;
wherein the pilot has fins facing the aperture, the fins driving a fluid flow.

14. The torque converter as recited in claim 13 wherein the turbine hub is connected to the flange via a bearing.

15. The torque converter as recited in claim 14 wherein the bearing is a ball bearing.

16. The torque converter as recited in claim 13 wherein the pilot has different radial diameters.

17. The torque converter as recited in claim 13 wherein flow holes are stamped in the flange of the cover.

18. The torque converter as recited in claim 13 wherein the pilot is welded to the cover.

* * * * *